United States Patent [19]

Gift et al.

[11] Patent Number: 4,774,721
[45] Date of Patent: Sep. 27, 1988

[54] CABLE PAIR TO TELEPHONE NUMBER VERIFICATION SYSTEM

[75] Inventors: Stephan Gift, Santa Cruz; Naipaul Ojar, Tunapuna; Linus Rogers, Pointe-a-Pierre, all of Trinidad and Tobago

[73] Assignee: Trinidad & Tobago Telephone Company Limited, Port of Spain, Trinidad and Tobago

[21] Appl. No.: 70,412

[22] Filed: Jul. 7, 1987

[30] Foreign Application Priority Data

Jul. 29, 1986 [TT] Trinidad and Tobago ...... TT.No.74

[51] Int. Cl.⁴ .................. H04M 3/26; H04B 3/46
[52] U.S. Cl. .................................. 379/10; 379/25; 379/26; 379/27
[58] Field of Search ............... 379/12, 5, 6, 10, 22, 379/25, 26, 27

[56] References Cited

U.S. PATENT DOCUMENTS 3,973,090 8/1976 Miller ..................................... 379/27
4,594,480 6/1986 Betton .................................... 379/10

Primary Examiner—Stafford D. Schreyer
Attorney, Agent, or Firm—Silverman, Cass, Singer & Winburn, Ltd.

[57] ABSTRACT

A cable pair to telephone verification system including a processor interfaced wtih pairs of subscriber lines and a trunk connected to automatic number identification (ANI) electronic switching means. The process is programmed to select pairs of subscriber lines in sequence and to connect a line pair which is not busy to the processor for testing. The processor generates a special access code on receipt of a dialing tone from a non-busy line pair, the ANI switching means being responsive to this special access code to send the associated subscriber telephone number to the processor via the trunk. The processor is also programmed to provide a data read out of information relating to the line pairs under test and whether or not faults are present.

8 Claims, 4 Drawing Sheets

| | |
|---|---|
| Vertical Frame No. | ? 20 |
| Cable No. | ? 1 |
| Block Start No. | ? 1001 |
| 1st Pair to be tested | ? 1 |
| No. of Pairs to be tested | ? 100 |

Do you have any ERRORS ? (Y/N)n
Ready to start ? (Y/N)y

Fig. 2

| Pair | Number | Pair | Number | Pair | Number | Pair | Number |
|---|---|---|---|---|---|---|---|
| 1001 | 657-3904 | 1026 | 6 | 1051 | 2 | 1076 | 657-3974 |
| 1002 | 657-3918 | 1027 | 6 | 1052 | 6 | 1077 | 657-3978 |
| 1003 | 657-3905 | 1028 | 657-3940 | 1053 | 6 | 1078 | 657-3981 |
| 1004 | 657-3672 | 1029 | 2 | 1054 | 8 | 1079 | 657-3102 |
| 1005 | 6 | 1030 | 657-3980 | 1055 | 657-3861 | 1080 | 6 |
| 1006 | 2 | 1031 | 2 | 1056 | 657-3870 | 1081 | 657-3988 |
| 1007 | 6 | 1032 | 657-3808 | 1057 | 6 | 1082 | 6 |
| 1008 | 657-3662 | 1033 | 657-8392 | 1058 | 2 | 1083 | 657-3989 |
| 1009 | 2 | 1034 | 657-3818 | 1059 | 657-3879 | 1084 | 657-3107 |
| 1010 | 8 | 1035 | 657-3820 | 1060 | 657-3881 | 1085 | 657-3992 |
| 1011 | 6 | 1036 | 657-3252 | 1061 | 6 | 1086 | 657-3109 |
| 1012 | 657-3652 | 1037 | 657-3251 | 1062 | 6 | 1087 | 6 |
| 1013 | 6 | 1038 | 657-3250 | 1063 | 2 | 1088 | 6 |
| 1014 | 6 | 1039 | 652-8692 | 1064 | 6 | 1089 | 657-3110 |
| 1015 | 6 | 1040 | 657-3811 | 1065 | 657-3994 | 1090 | 657-3111 |
| 1016 | 657-3916 | 1041 | 6 | 1066 | 657-3946 | 1091 | 657-3112 |
| 1017 | 657-3907 | 1042 | 657-3824 | 1067 | 2 | 1092 | 657-3125 |
| 1018 | 2 | 1043 | 657-3827 | 1068 | 657-3954 | 1093 | 657-3113 |
| 1019 | 657-3920 | 1044 | 6 | 1069 | 657-3852 | 1094 | 657-3919 |
| 1020 | 2 | 1045 | 657-3841 | 1070 | 2 | 1095 | 657-3935 |
| 1021 | 2 | 1046 | 652-8495 | 1071 | 6 | 1096 | 657-3936 |
| 1022 | 2 | 1047 | 657-3843 | 1072 | 657-3966 | 1097 | 657-3939 |
| 1023 | 2 | 1048 | 6 | 1073 | 657-3968 | 1098 | 657-3938 |
| 1024 | 2 | 1049 | 6 | 1074 | 657-3970 | 1099 | 657-3941 |
| 1025 | 657-3930 | 1050 | 657-3847 | 1075 | 657-3973 | 1100 | 657-3943 |

Error - Condition of line tested

1 - telex, 2 - Dead or Data, 3 - Idle

4 - Busy, 5 - Manual Check needed, 6 - No dial tone Detected

7 - Faulty Connection, 8 - No answer received

9 - Fluctuating Voltage on line

CABLE PAIR TO TELEPHONE NUMBER VERIFICATION SYSTEM

This invention relates to a Main Distribution Frame (MDF) cable pair-to-telephone number verification system.

Quite frequently it is found that records of cable pair-to-telephone number assignment are inaccurate as a result of the continual churn at the MDF in a telephone exchange. As a result, telephone companies periodically carry out a record verification exercise so as to reconcile the MDF assignment records. For most companies, this is a manual exercise which can take several weeks to complete depending upon the size of the MDF. Along with this, the manual exercise is generally prone to human errors, often brought about by a fatigued craftperson and as a result, the records are at best 95% accurate following the verfification process.

It is therefore desirable to provide an automated system that reduces the manual requirement. Moreover it is desirable that such a system be of moderate cost so that it can be economically feasible to have one permanently located in an exchange.

The invention provides a subscriber pair identification system comprising processing means, and interface means for interfacing said processing means with a plurality of pairs of subscriber lines and with a trunk connected to automatic number identification (ANI) electronic switching means; said ANI electronic switching means being responsive to a special access code, generated by said processing means, to send the associated subscriber telephone number to said processing means via said trunk, said special access code being generated by said processing means on receipt of a dialling tone from a subscriber line pair which is not busy and which is currently under test; said processing means including data read out means and being programmed to provide, on said data read out means, information relating to the subscriber line pair under test, said processing means being further programmed to select pairs of subscriber lines in sequence in order to monitor said subscriber line pairs for activity, to determine whether or not a subscriber line pair is not busy and to connect a subscriber line pair which is not busy to said processing means for testing, said data read out means providing information concerning whether or not faults are present in any of the subscriber line pairs when the testing sequence has been completed.

A preferred embodiment of the invention will now be described with reference to the accompanying schematic drawings, in which:

FIG. 2 illustrates a typical print-out from the printer shown connected to the SPI system of FIG. 1.

Figure 1:
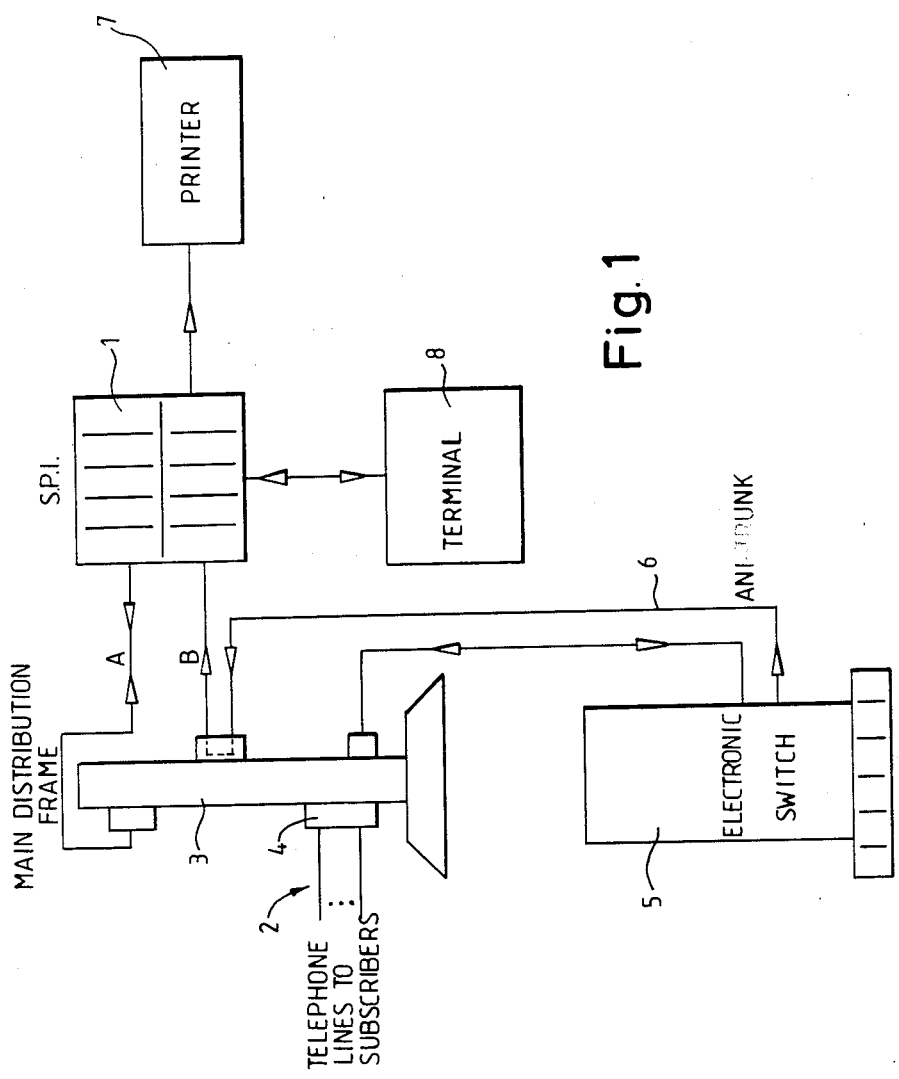
FIG. 1 is a block diagram showing a network configuration which includes a subscriber pair identification (SPI) system in accordance with a preferred embodiment of the invention.

The network shown in FIG. 1 includes an SPI system 1 which includes a micro-processo-based controller and various circuits for interfacing to the subscriber's line, the central office trunk and the system operator. The SPI 1 is bridged through line A to subscribers pairs 2 on the vertical side of an MDF 3 via a 100 pair connector 4. The SPI is also connected through line B to Automatic Number Identification (ANI) electronic switching means 5 (of known construction) via an ANI trunk 6 which is used to obtain the line number from the switching means 5. User interface is via a terminal and printer arrangement 7. Upon power-up, SPI 1 initializes itself and immediately prompts the user, at terminal 2, for information on the cable number and number of pairs to be tested. The user is then taken through a user-friendly menu where the following information is entered into the system:

Vertical Frame Number
Cable Number
Block Start Number
First Cable Pair to be tested
Number of Pairs to be tested After this information is entered, the system then selects the first pair to be tested by operating the appropriate line relay and the subscriber's line is monitored for activity. If the line is busy, the system will note it, flag it for future testing and move on to the next pair to be tested. If the pair is idle, it is looped in an attempt to obtain dial tone. Upon recipe of dial tone, SPI 1 dials a special access code. The switching means 5 then responds by sending the associated subscriber telephone number (in R1 signalling format) to the SPI 1 via the ANI trunk 6. The SPI 1 decodes and stores the telephone number, drops the line and selects the next line to be tested. If SPI 1 encounters a line whose signature it is not programmed to test (e.g. Data, Telex and Security lines) it immediately notes it, releases the line and selects the next line to be tested.

When SPI 1 has tested the last line, it will re-try all those lines that were noted as busy on the earlier attempt. If a line is still busy after a pre-programmed number of tries, the line is noted as a busy condition.

Upon completion, the printer 7 then gives a printout showing the cable pair and the associated telephone number, fault code or line type (FIG. 2) after which an audible alarm is activated to alert the craftperson that the testing is completed.

Typically, it takes less than 10 minutes to test 100 pairs. The system then prompts the operator to disable the audible alarm before proceeding with prompts for additional printouts and or set up for the next 100 pairs to be tested. At this point, the operator could then move the 100 pair connector to another 100 pairs on the MDF, enter the relevant information into the system and then proceed to test them.

Figure 3:
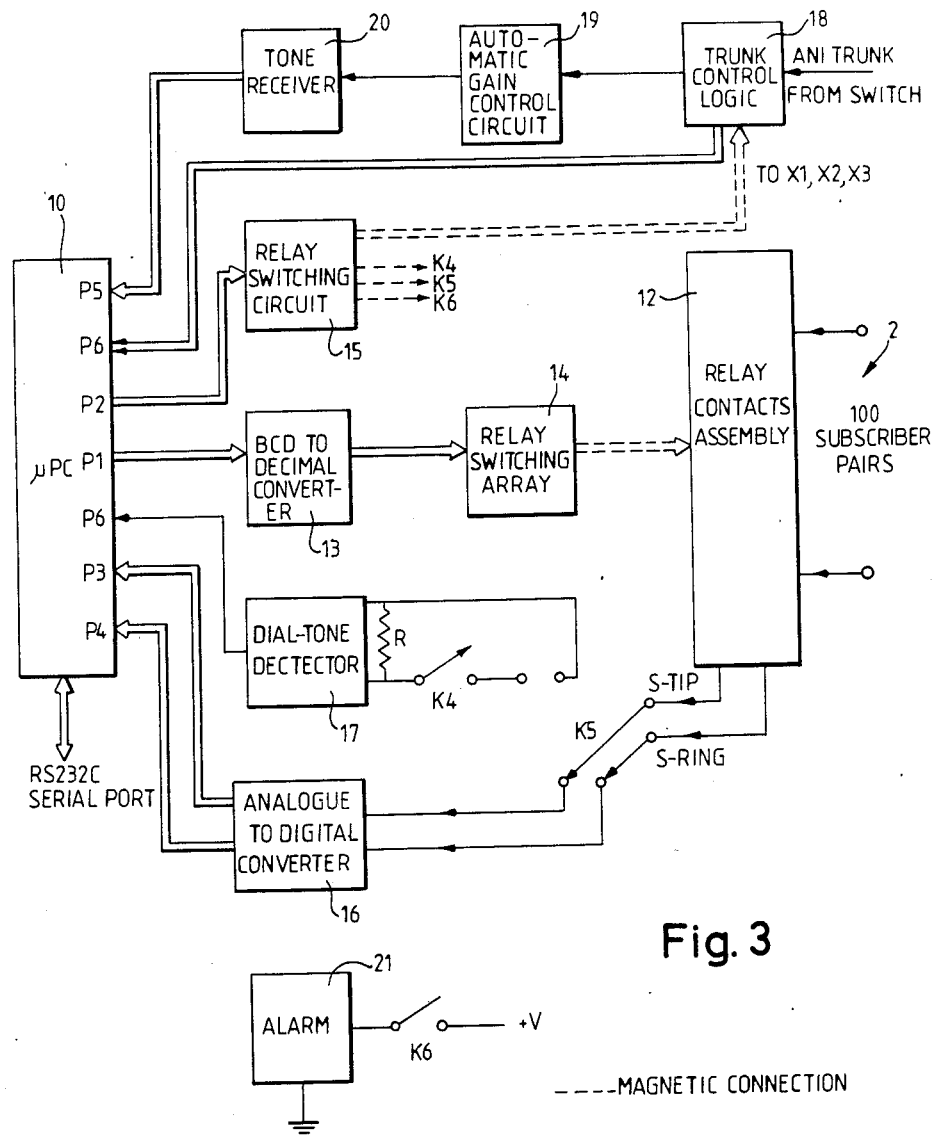
FIG. 3 is a block diagram of the SPI.

Referring to FIG. 3, the SPI 1 comprises a microprocessor controller 10 having the following minimum specifications: an 8-bit microprocessor, 2K RAM for data storage, 8K EPROM for program storage, six 8-bit parallel ports (2 out, 4 in) for controller communication with the various interface circuits and one RS-232-C serial port 11 (of standard construction) for controller communication with terminal printer 7. Double pole, single throw relays in a relay contacts assembly 12 are used for making electrical connection to the telephone lines 2 on the MDF 3 through the 100 pair connector 4. These relays are controlled by the microprocessor controller 10 via a binary coded decimal (BCD) to decimal converters 13 and a relay switching array 14 which contains the necessary electronic hardware for driving any single relay coil in response to the output from the BCD converters 13. By writing an appropriate data word to port P1, any switch in the relay contacts assembly 12 can be closed thereby connecting S-TIP and S-RING in FIG. 3 to one of the hundred subscriber pairs accessed by the 100 pair connector 4. Relay K5, the contacts of which are connected to S-TIP and S-RING and which is operated through a relay switching circuit 15 and port P2, allows the electrical condition of the selected subscriber pair to be measured using an analogue-to-digital (A/D) converter 16. The output of the A/D converter 15 is then transferred to the microprocessor controller through ports P3 and P4.

After this is completed, relay K5 is switched to its other pair of contacts and the selected line looped using relay K4 and resistor R. A dial tone detector 17 connected across R detects the presence of dial tone on the selected telephone line and communicates with the controller 10 through one bit of port P6. When dial tone is detected, the controller 10 dials the special access code through the selected subscriber line to the switching means 5 by alternatively opening and closing the contact of relay K4.

The ANI electronic switching means 5 must be appropriately configured (e.g. by means of translations) such that receipt of this special access code forces seizure of an Automatic Number Identification (ANI) trunk. Trunk control logic 18 detects this seizure and, after going through the appropriate signalling handshake (of a form which depends on the type of trunk being used) with the switching means 5, number information is passed along the ANI trunk 6 in R1 signalling format. This signal goes to an automatic gain control (AGC) circuit 19 which ensures a constant amplitude signal drive to a tone receiver 20. Tone receiver 20 converts the tones into binary patterns corresponding to the digits of the associated telephone number which are then passed to controller 10 via port P5.

Upon completion of the tests, relay K6 is operated through the relay switching circuit 15, which activates alarm means 21. User communication with the controller is made through the RS-232-C serial port 11 to which the terminal 8 (receive/transmit) and the printer (receive only) are connected.

The main program of the system is written in (a subset of) BASIC. However, because of the greater execution speed requirements, the number decoding routine is written in assembly language. A rudimentary digital filter is included in the algorithm in order to ensure complete accuracy of the number identification process. An error code is included in order to identify lines that are noisy or disconnected and cannot be tested. Such lines are printed out and tested manually.

Figure 4:
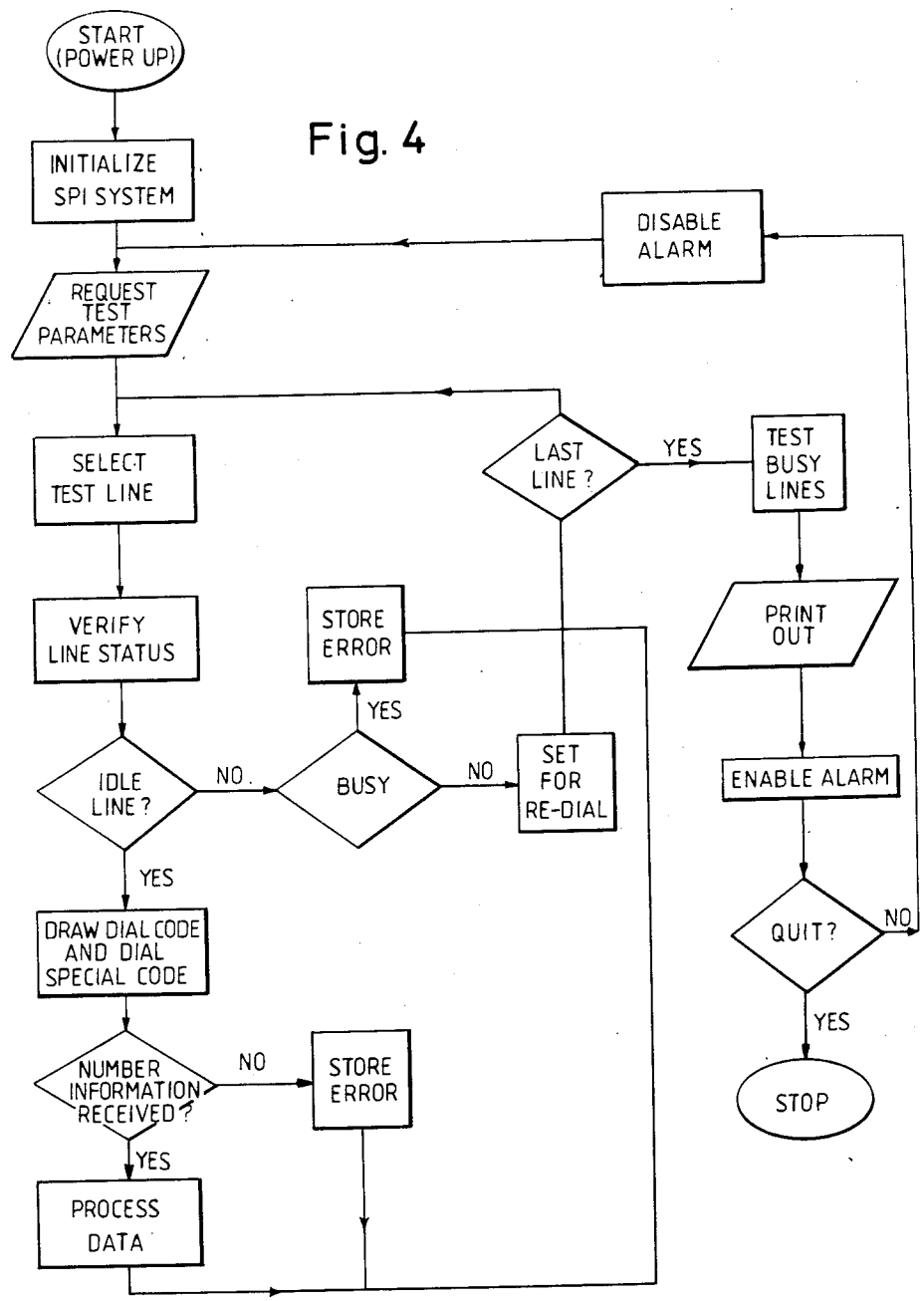
FIG. 4 is a system flow chart.

A flow chart is given in FIG. 4.

In order to provide an example of system performance, the SPI was given a field trial in the Thompson Exchange of the Telephone Company whre over thirty-five thousand numbers were tested.

The following results were noted:
i. SPI is 100% accurate
ii. SPI is about ten times faster than a technician
iii. SPI operates essentially independently and therefore relieves the technician of an extremely tedious and boring task.

The SPI can therefore provide the following advantages:
(a) It can produce 100% accurate records of cable pair to telephone number assignments at the MDF.
(b) It can provide a major improvement in the time it takes to do the record reconciliation task manually.
(c) Craftpersons can be freed to pursue other tasks while the SPI is working on a 100 pair block.
(d) It can produce a hardcopy which can be used as a permanent record.
(e) It contains an RS-232-C serial port which may be used to communicate via modems to a remote printer or personal computer.
(f) It can automatically flag all untestable lines and indicates line type.
(g) Service to the customers is not disrupted.
(h) It is user-friendly and requires little or no operator training.
(i) It will record unassigned line assignments.

Whilst an example of the invention has been described in detail above, it will be understood that variations and modifications may be made without departing from the scope of the invention.

We claim:

1. A subscriber pair identification system comprising processing means, and interface means for interfacing said processing means with a plurality of pairs of subscriber lines and with a trunk connected to automatic number identification (ANI) electronic switching means; said ANI electronic switching means being responsive to a special access code, generated by said processing means, to send the associated subscriber telephone number to said processing means via said trunk, said special access code being generated by said processing means on receipt of a dialling tone from a subscriber line pair which is not busy and which is currently under test; said processing means including data read out means and being programmed to provide, on said data read out means, information relating to the subscriber line pair under test, said processing means being further programmed to select pairs of subscriber lines in sequence in order to monitor said subscriber line pairs for activity, to determine whether or not a subscriber line pair is not busy and to connect a subscriber line pair which is not busy to said processing means for testing, said data read out means providing information concerning whether or not faults are present in any of the subscriber line pairs when the testing sequence has been completed.

2. A system according to claim 1 wherein said processing means is programmed to advance the testing sequence to a subsequent subscriber line pair to be tested if a previous subscriber line is busy.

3. A system according to claim 1 wherein said processing means is programmed to return to the subscriber line pair or pairs which were busy during a first testing sequence and either to test said pair or pairs if it or they are no longer busy, or to cause said data read out means to indicate that said pair or pairs are still busy.

4. A system according to claim 3 wherein said processing means is programmed to return to the subscriber line pair or pairs a predetermined plurality of times if said pairs are still busy.

5. A system according to claim 1 wherein said processing means is programmed to advance the testing sequence to a subsequent subscriber line pair if a previous subscriber line pair is of a type which said processing means is not programmed to test.

6. A system according to claim 1 wherein said data read out means is capable of providing a printout showing the subscriber line pair, an associated telephone number and a fault code or line type.

7. A system according to claim 1 wherein an indication is given to a user of the system when the testing is completed.

8. A system according to claim 1 wherein said processing means include a port for providing information to said data read out means in the form of a data stream.

* * * * *